(12) United States Patent
Goh et al.

(10) Patent No.: US 9,108,114 B2
(45) Date of Patent: Aug. 18, 2015

(54) TANGIBLE USER INTERFACE AND A SYSTEM THEREOF

(75) Inventors: Wooi Boon Goh, Singapore (SG); Fitriani, Singapore (SG); Choon Ching Tan, Singapore (SG); Su Lim Tan, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 14/130,744

(22) PCT Filed: Jun. 21, 2012

(86) PCT No.: PCT/SG2012/000220
§ 371 (c)(1),
(2), (4) Date: Jan. 3, 2014

(87) PCT Pub. No.: WO2013/006139
PCT Pub. Date: Jan. 10, 2013

(65) Prior Publication Data
US 2014/0213140 A1 Jul. 31, 2014

Related U.S. Application Data

(60) Provisional application No. 61/505,443, filed on Jul. 7, 2011.

(51) Int. Cl.
*A63H 30/04* (2006.01)
*A63H 3/28* (2006.01)
*G06F 3/00* (2006.01)

(52) U.S. Cl.
CPC . *A63H 3/28* (2013.01); *G06F 3/002* (2013.01)

(58) Field of Classification Search
USPC .......................................................... 446/465
See application file for complete search history.

(56) References Cited

U.S. PATENT DOCUMENTS

| | | | |
|---|---|---|---|
| 6,271,453 B1* | 8/2001 | Hacker | 84/476 |
| 6,687,128 B2* | 2/2004 | Tokuhara | 361/724 |
| 2002/0196250 A1* | 12/2002 | Anderson et al. | 345/420 |
| 2003/0148700 A1* | 8/2003 | Arlinsky et al. | 446/91 |
| 2006/0154711 A1* | 7/2006 | Ellis et al. | 463/1 |
| 2006/0172787 A1* | 8/2006 | Ellis et al. | 463/1 |
| 2006/0252340 A1* | 11/2006 | Bach et al. | 446/124 |
| 2008/0153559 A1* | 6/2008 | de Weerd | 463/9 |
| 2008/0188300 A1* | 8/2008 | Ellis | 463/30 |
| 2009/0273560 A1* | 11/2009 | Kalanithi et al. | 345/156 |

(Continued)

FOREIGN PATENT DOCUMENTS

WO 2011/112498 A1 9/2011

OTHER PUBLICATIONS

International Search Report for PCT/SG2012/000220 dated Sep. 6, 2012.

*Primary Examiner* — Tramar Harper
(74) *Attorney, Agent, or Firm* — Sughrue Mion, PLLC

(57) ABSTRACT

The present invention relates to a TUI having a plurality of faces. A sensing system is provided to detect the presence of one or more adjacent TUIs within a predetermined sensing distance of one of the faces. Thus, the sensing system is arranged to detect whether any of the faces of the TUI opposes one or more adjacent TUIs. It may further be able to detect the relative orientation of opposing faces of the TUI and the one or more adjacent TUIs. The sensing system is further configured to enable the determination of the orientation of the TUI with respect to the vertical direction.

26 Claims, 13 Drawing Sheets

(a)

(b)

(56) References Cited

U.S. PATENT DOCUMENTS

| | | | |
|---|---|---|---|
| 2010/0001923 A1* | 1/2010 | Zilber | 345/1.1 |
| 2011/0097996 A1* | 4/2011 | Kalanithi et al. | 455/41.1 |
| 2011/0151743 A1* | 6/2011 | Munch et al. | 446/91 |
| 2013/0302763 A1* | 11/2013 | Edwards et al. | 434/159 |

* cited by examiner

| i-Cube Feature | Signal Type | Description and Possible Uses | Pictorial Description |
|---|---|---|---|
| Block identity | Input | The i-Cube has a unique digital block identity known to the interactive application. | 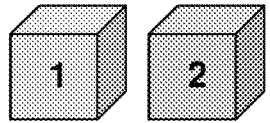 |
| Block vertical orientation | Input | The vertical orientation of the i-Cube can be determined so that the top cube face of the i-Cube can be known to the interactive application. | 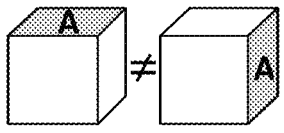 |
| Block tilt angle | Input | The tilt angle of the i-Cube with respect to the direction of Earth's gravity can be determined and known to the interactive application. | 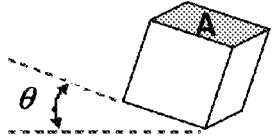 |
| Adjacent blocks and their relative orientation | Input | The opposing faces of adjacent i-Cubes, the relative orientation of these opposing faces, and the identities of these adjacent i-Cubes can be determined by the interactive application. | opposing faces<br />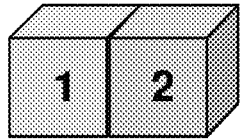 |
| Audio output | Output | The i-Cube is able to provide audio output e.g. audio playback using for example, a speaker. (Possible use: the interactive application may verbally 'count' the number of i-Cubes in a stack or teach numbers with a visual sense of spatial proportion). | 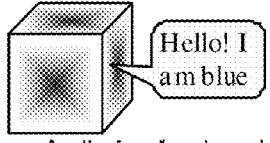<br />Audio feedback and communication with user |
| Visual output | Output | The i-Cube is able to provide visual output e.g. each i-Cube and/or i-Cube face can be illuminated with a different color and/or intensity. (Possible use: colors can be used to highlight which i-Cube(s) should be picked up or which i-Cube face(s) are currently active). | 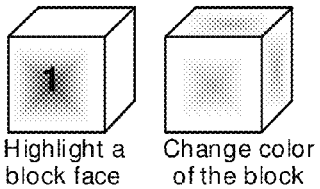<br />Highlight a    Change color<br />block face      of the block |

Fig. 5

TANGIBLE USER INTERFACE AND A SYSTEM THEREOF

CROSS REFERENCE TO RELATED APPLICATIONS

This application is a National Stage of International Application No. PCT/SG2012/000220 filed Jun. 21, 2012, claiming priority based on United States Provisional Application No. 61/505,443 filed Jul. 7, 2011, the contents of all of which are incorporated herein by reference in their entirety.

FIELD OF THE INVENTION

The present invention relates to a tangible user interface (TUI) and a system comprising a plurality of the TUIs.

BACKGROUND OF THE INVENTION

To date, many intercommunicating devices and products have been invented for use in for example, the field of human computer interaction or interactive computing. A list of computational devices that intercommunicate is detailed in a fairly comprehensive survey by Schweikardt and Gross (Schweikardt, 2007).

An example of an intercommunicating computational device is the cube-shaped intercommunicating TUI. Cube-shaped intercommunicating TUIs have been used in many applications. For example, they have been used to develop children's toys as elaborated below.

There is convincing evidence that significant changes occur in the brain during the early years of a child and during this period, much of the cognitive, social and emotional development of the child are nurtured through an environment of constructive play and exploration. For example, many aspects of traditional educational blocks are known to facilitate functional and symbolic play in early childhood (Gura, 1992; Wellhouse & Kieff, 2001). The educational benefits of such educational blocks have long been highlighted by educators such as Frederick Froebel (Frobel, 1887), and early kindergarten reformers such as Patty Smith Hill (Fowlkes, 1984) and Maria Montessori with her famous 'pink tower' building blocks (Montessori, 1964). In fact, studies have shown that there is a positive correlation between pre-school block play performance and math achievements in US high school and $7^{th}$ grade (Wolfgang, et al., 2001).

However, the static nature of traditional educational blocks limits the exploratory concepts that can be taught to a child during play. Though the potential for symbolic representation using the traditional educational blocks is powerful, the pedagogical scope of these blocks is often limited. On the other hand, cube-shaped intercommunicating TUIs serve as effective and flexible play-based pedagogies for young children. In providing such embedded technology support for children's concept development through play, it is important to realize that young children (below 8 years) are pre-operational and rely significantly on their visual and auditory perception in acquiring knowledge (Bee, 2000). Moreover, they are active learners who make use of their physical and social experiences to form an understanding of the world around them (Meadows, 1993).

FIGS. 1(a) and (b) show two commercially available toys based on stackable cube-shaped intercommunicating TUIs.

In particular, FIG. 1(a) shows a toy called "Cube World". In Cube World, each cube-shaped intercommunicating TUI is associated with an animated virtual character and comprises a LCD display on one of its faces. When different TUIs are magnetically and electrically connected, the LCD displays of these TUIs show how their associated animated virtual characters relate to one another.

FIG. 1(b) shows a music-making toy called "CuBees". CuBees uses a plurality of cube-shaped intercommunicating TUIs with each TUI associated with a sound and constructed to resemble an animal. Depending on how the TUIs are stacked on top of one another or how they are placed alongside one another, different pre-recorded musical audios based on the sounds associated with the TUIs are played. In CuBees, different TUIs are associated with different sounds and thus, children can be taught to appreciate musical concepts such as synchronization and hierarchy through different arrangements of the TUIs.

Cube-shaped intercommunicating TUIs have also been used to provide users with a physical means to specify (or program) relational semantics between basic elements. In particular, different relational semantics may be specified by using different spatial arrangements of the cube-shaped intercommunicating TUIs.

FIGS. 2(a)-(c) show examples of how cube-shaped intercommunicating TUIs may be used for specifying relational semantics between basic elements.

In particular, FIG. 2(a) shows a system invented by the MIT Media Lab called "Siftables" (Merrill 2007). In Siftables, each cube-shaped intercommunicating TUI is associated with a basic element. Visual concepts of the basic elements are depicted in the form of pictures and texts on small colored LCD displays of the TUIs. By changing the spatial relationship of the TUIs, a user is able to define different relationships between the basic elements associated with the TUIs. Once a relationship is defined, corresponding audio-visual responses may be produced.

FIG. 2(b) shows a system invented by Sony's Interaction Lab called "Blockjam" whereas FIG. 2(c) shows a system invented by Bert Schiettecatte called "AudioCubes". Both Blockjam and AudioCubes provide the same physical spatial programmability function as Siftables but are applied specifically to sound elements such as sound generators, sound operators (e.g. for additive or subtractive operations between sounds) and sound transformers (e.g. for controlling the volume, distortions, modulations, etc).

A limitation of existing cube-shaped intercommunicating TUIs is that it is only possible to determine the spatial relationship between the TUIs along a single plane. Therefore, for the TUIs to perform their functions, the TUIs can only be arranged along a single plane. For example, the TUIs shown in FIGS. 1(a)-(b) can only be stacked along a vertical plane whereas the TUIs shown in FIGS. 2(a)-(c) can only be arranged along a horizontal plane.

SUMMARY OF THE INVENTION

The present invention aims to provide a new and useful TUI, for use as one of a set of TUIs.

A first aspect of the invention proposes, in general terms, that a first TUI has sensors on each of its faces for determining which faces of the first TUI are proximate other of the TUIs, and the relative orientations of those faces of the first TUI and the other TUIs (i.e. their relative angular position about a line connecting the centres of the TUIs).

Specifically, the first aspect of the present invention is a TUI for use as part of a set of TUIs, the TUI comprising:
- a housing having a plurality of faces; and
- a sensing system configured to detect, for each of said faces, whether another of the set of TUIs is within a predetermined sensing distance from the face, and, for each face of the TUI for which the determination is positive, the relative orientation of that face of the TUI and the corresponding opposing TUI.

A second aspect of the invention proposes, in general terms, a TUI containing an accelerometer, for measuring the orientation of the TUI with respect to the vertical direction (i.e. the direction of Earth's gravity). As in the first aspect of the invention, the TUI has sensors on each of its faces for detecting the presence of other TUIs.

A set of TUIs employing one or both aspects of the invention may comprise a mechanism for using the outputs of the sensing systems of the TUIs to establish the relative three-dimensional positional relationship of the TUIs. In a preferred case, the TUIs are cubic, and each of the six faces is provided with a sensing system for detecting other proximate TUIs.

BRIEF DESCRIPTION OF THE FIGURES

Embodiments of the invention, referred to as "i-Cubes", will now be illustrated for the sake of example only with reference to the following drawings, in which:

FIG. 5 illustrates a table describing some features an i-Cube may have;

DETAILED DESCRIPTION OF THE EMBODIMENTS

Figure 1:
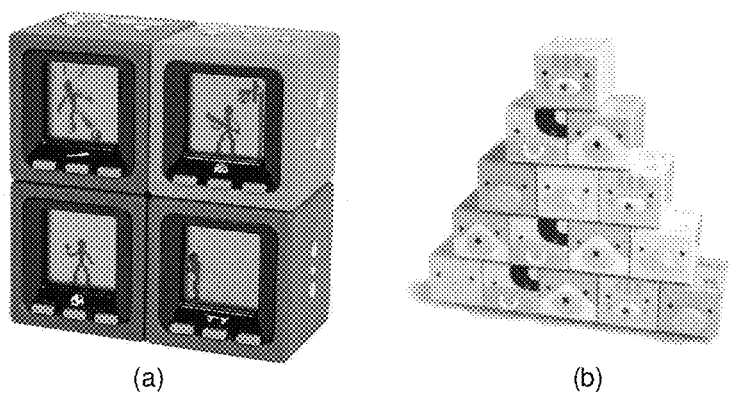
FIGS. 1(a)-(b) show two toys based on stackable cube-shaped intercommunicating TUIs.
Figure 2:
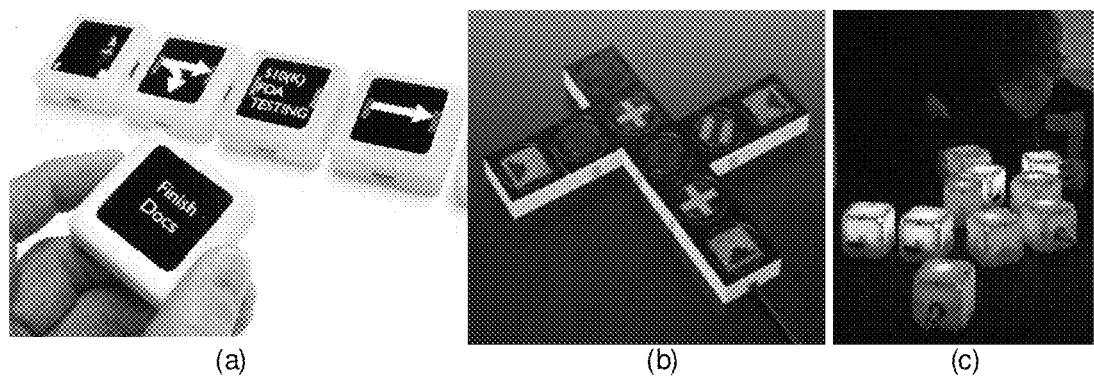
FIGS. 2(a)-(c) show three systems for specifying relational semantics between basic elements using cube-shaped intercommunicating TUIs.
Figure 3:
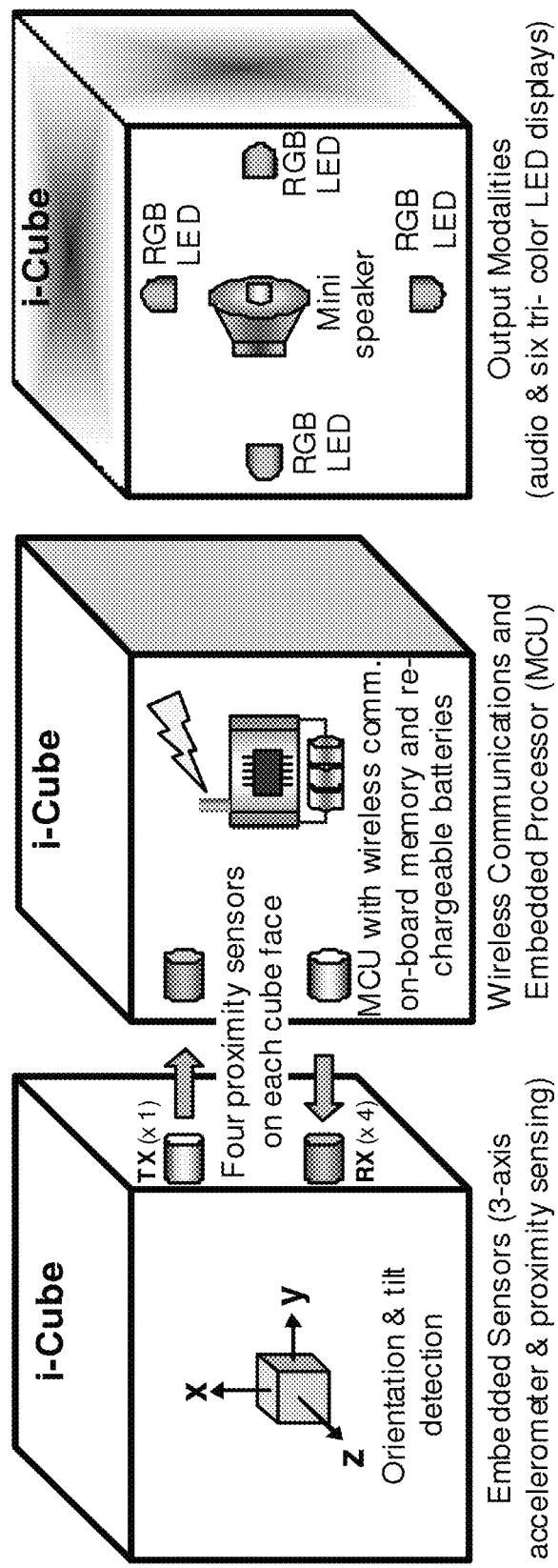
FIG. 3 shows a system according to an embodiment of the present invention wherein the system comprises a plurality of embedded computing devices in the form of i-Cubes.

Referring to FIG. 3, a system 300 according to an embodiment of the present invention is shown. The system 300 comprises a plurality of embedded computing devices in the form of cube-shaped intercommunicating TUIs, each of which may be referred to as an Interactive Inter-communicating Interface (III) or in short, i-Cube. The system 300 allows a user to interact with an intelligent computing system by physically manipulating and arranging the plurality of i-Cubes.

Figure 4:
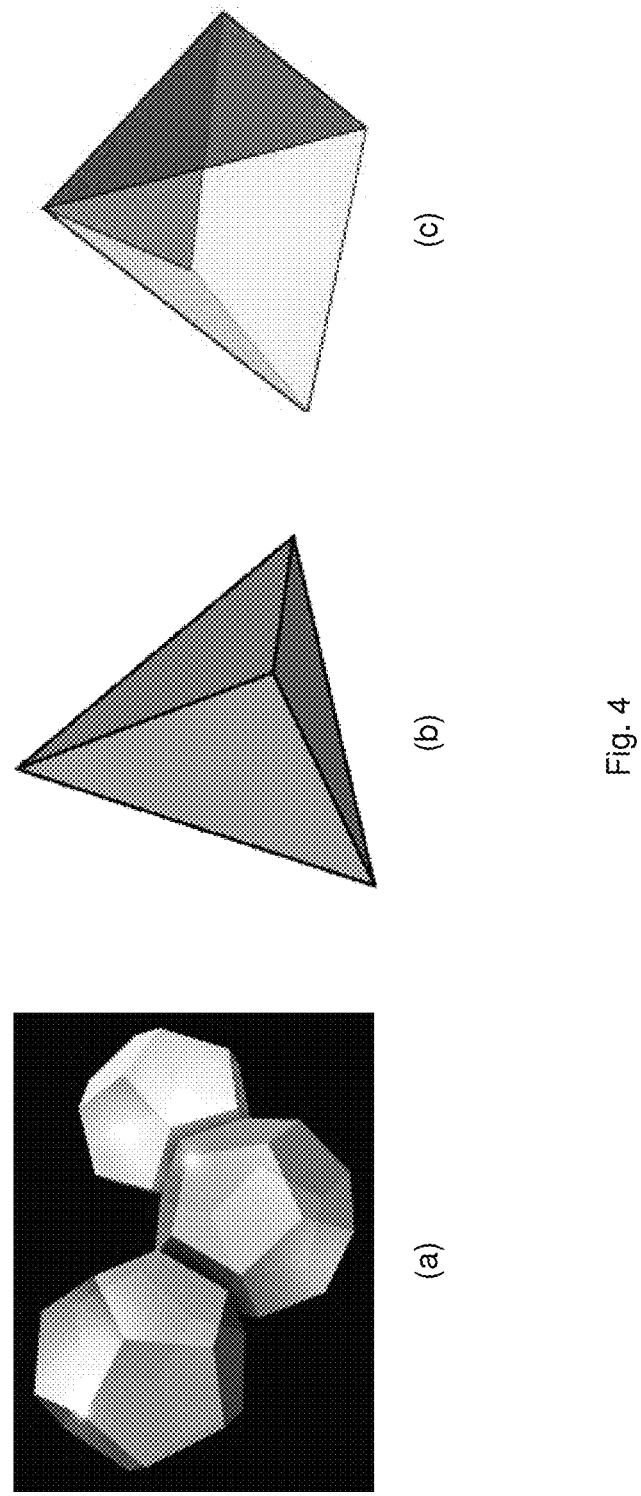
FIGS. 4(a)-(c) show alternative shapes which the embedded computing devices in the system of FIG. 3 can take, with the shapes in FIGS. 4(a)-(b) being more preferable than the shape in FIG. 4(c)

Note that although three i-Cubes are shown in FIG. 3, the system 300 may comprise more than three i-Cubes or only two i-Cubes. Furthermore, the embedded computing devices in system 300 may alternatively be in the form of TUIs in shapes other than the cube and may each comprise a different number of faces from the i-Cube. For instance, each TUI may be in the form of a dodecahedron (pentagon-faced structure such as that shown in FIG. 4(a) or a regular tetrahedron (equilateral triangle-faced structure) such as that shown in FIG. 4(b). However, it is preferable if all the faces of each TUI in system 300 are of an identical shape. For example, it is better to avoid using TUIs in the form of pyramids since a pyramid comprises three triangular faces and one square face as shown in FIG. 4(c). It is even more preferable if the shape of each TUI face is symmetrical and if the TUI is 3-dimensionally symmetric.

The i-Cube and system 300 will now be described in more detail. The following description can easily be extended to TUIs of different shapes and/or with different numbers of faces. For example, while the enclosure for the i-Cube is cube-shaped, the enclosure for a TUI with a different shape is clearly in the different shape. Furthermore, the number and arrangement of sensors in a TUI with a different shape can easily be adjusted accordingly to achieve the same functions as the i-Cube's sensors described below. As mentioned above, TUIs with different shapes and/or different number of faces from the i-Cube may also be used in system 300.

Features of the i-Cube

FIG. 5 illustrates a table describing some features an i-Cube may have. In particular, each i-Cube of system 300 has one or more of the features shown in FIG. 5. With these features, the three-dimensional (3D) spatial relationship and relative orientation of a plurality of i-Cubes can be determined. These features thus allow for the potential implementation of interesting pedagogical designs based on the i-Cubes.

Specifically, the features shown in FIG. 5 are as follows:
(i) the i-Cube has a unique digital block identity;
(ii) the vertical orientation (i.e. orientation with respect to the direction of Earth's gravity) and thus, the top cube face of the i-Cube can be determined;
(iii) the tilt angle of the i-Cube with respect to the direction of Earth's gravity can be determined;
(iv) the opposing faces of adjacent i-Cubes, relative orientation of these opposing faces and the identities of these adjacent i-Cubes can be determined;
(v) the i-Cube is able to provide audio output using, for example, a speaker;
(vi) the i-Cube is able to provide visual output, for example, each i-Cube and/or i-Cube face can be illuminated with a different color and/or a different intensity.

The system 300 comprising the plurality of i-Cubes may be used for an interactive application with the input to the application associated with one or more of features (i)-(iv) above and the output of the application associated with one or both of features (v) and (vi) above. In particular, the interactive application may, through the use of the audio output of the i-Cubes, verbally 'count' the number of i-Cubes in a stack (i.e. stacking height) or teach numbers with a visual sense of spatial proportion. The interactive application may also use the visual output of the i-Cubes to highlight certain i-Cube(s) or i-Cube face(s) with different colors.

Components of the i-Cube

Each i-Cube in system 300 comprises a plurality of components, examples of which are shown in FIG. 3 (note that within each i-Cube in FIG. 3, only some of its components are shown). These components serve to provide the features described in the table of FIG. 5.

In general, each i-Cube comprises a self-powered embedded computing system which may be endowed with a suite of sensors, audio-visual output capabilities and/or communication abilities. More specifically, each i-Cube comprises one or more of the following components: a processor, a sensing system, an output system, a primary communication system, a power source and an enclosure (i.e. housing) as described in more detail below.

Processor

Each i-Cube in system 300 comprises a processor for storing and processing data. The processor comprises input-output peripheral support for interfacing the i-Cube with other parts of system 300 (for example, other i-Cubes and/or a central controller). The processor is preferably a low-powered embedded processor.

Sensing System

Each i-Cube in system 300 comprises a sensing system configured to detect the presence of one or more adjacent i-Cubes within a predetermined sensing distance. The sensing system is further configured to enable the determination of which face(s) of the i-Cube oppose one of the adjacent i-Cube(s), and the relative orientations of those face(s) of the i-Cube and the adjacent i-Cube(s). In one example, the sensing system is also configured to enable the determination of the vertical orientation of the i-Cube and a tilt angle of the i-Cube with respect to the direction of Earth's gravity.

The sensing system may comprise a physical sensing system and a proximity sensing system as follows.

Physical Sensing System

The physical sensing system of each i-Cube is configured to enable the determination of the vertical orientation of the i-Cube. The physical sensing system may be further configured to enable the determination of the tilt angle of the i-Cube with respect to the direction of Earth's gravity.

3-Axis Accelerometer

In one example, the physical sensing system comprises a 3-axis accelerometer capable of determining the vertical orientation of the i-Cube. Therefore, it is possible to determine which face of the i-Cube is oriented upwards (i.e. which is the top cube face of the i-Cube) and which is oriented downwards. This is the only absolute cube face reference that can be determined unambiguously by the 3-axis accelerometer. The directions of the remaining i-Cube faces (e.g. front, back, left, right) are relative since the definitions of these directions are dependent on the view point of the user.

Figure 6:
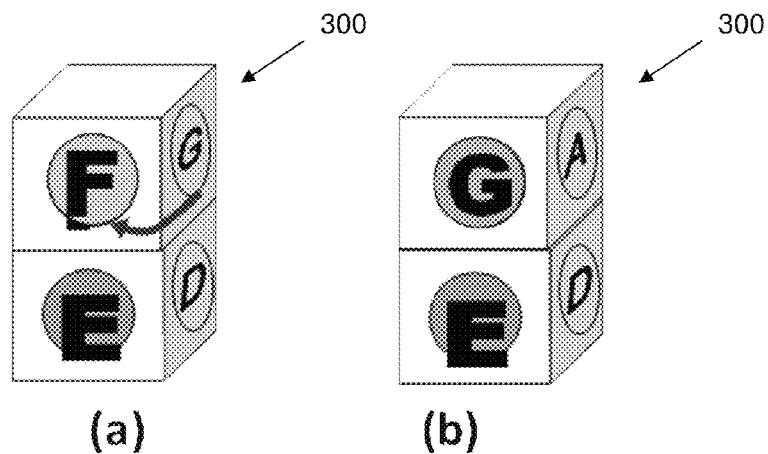
FIGS. 6(a)-(b) show a change in relative orientation between opposing i-Cube faces which cannot be detected using a 3-axis accelerometer.

Note that although the 3-axis accelerometer is able to determine the vertical orientation of the i-Cube, it is not always possible to determine the relative orientation between opposing i-Cube faces using the 3-axis accelerometer alone. FIGS. 6(*a*)-(*b*) illustrate this. In particular, FIG. 6(*a*) shows two i-Cubes stacked on top of each other. FIG. 6(*b*) shows the same stack of i-Cubes except that the top i-Cube has been rotated 90 degrees about the vertical axis (see arrow on the top i-Cube in FIG. 6(*a*)). This rotation causes a change in the relative orientation of the opposing i-Cube faces. However, this change cannot be detected by the 3-axis accelerometer since the vertical orientation of the top i-Cube remains unchanged after the rotation.

The 3-axis accelerometer is also capable of determining the tilt angle of the i-Cube with respect to the direction of Earth's gravity.

Proximity Sensing System

The proximity sensing system of each i-Cube is configured to detect the presence of one or more adjacent i-Cubes within a predetermined sensing distance.

Although the proximity sensing system may utilize optical-based sensors or electrodes, there are several problems with such proximity sensing systems as elaborated below.

Practical considerations when using a plurality of TUIs for specifying interactive 3D spatial arrangements require that the plurality of TUIs are in direct physical contact or at least in very close proximity before determining the spatial relationship of the TUIs. This is to minimize the possibility of false triggers, in other words, the possibility of responding to spatial relationships which are unintended by the user.

Figure 7:
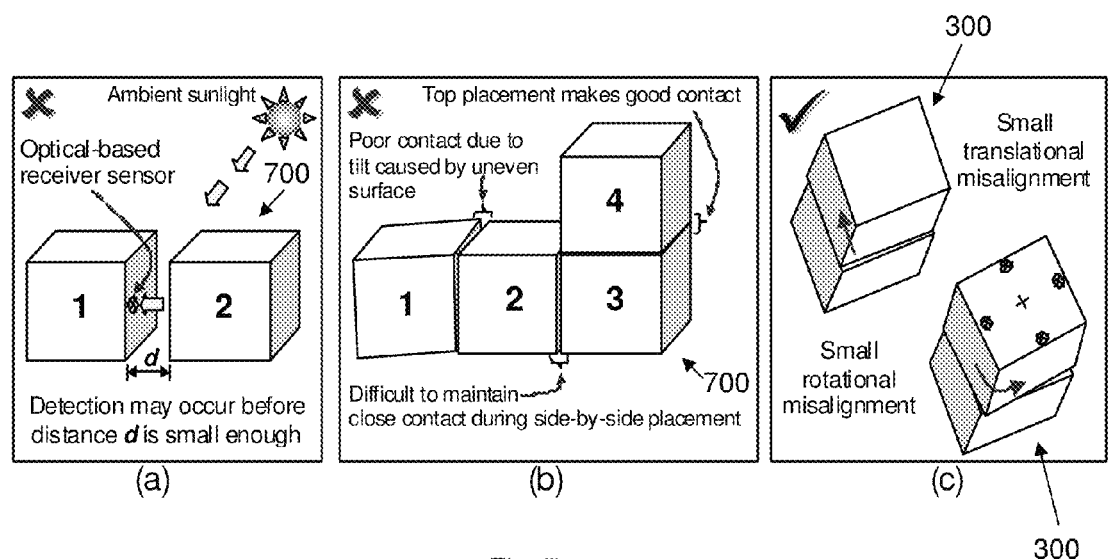
FIGS. 7(a)-(c) show how using certain types of proximity sensors in cube-shaped TUIs may increase the chances of errors.

FIGS. 7(*a*)-(*c*) show how using optical-based sensors or electrodes in cubic TUIs may increase the chances of errors, in particular, increase the possibility of detecting unintended spatial relationships or the possibility of overlooking intended spatial relationships.

Specifically, FIG. 7(*a*) shows a system 700 comprising two cubic TUIs whose proximity sensing systems employ optical-based sensors, such as infra-red light emitting diodes or phototransistors. In FIG. 7(*a*), the cubic TUIs are aligned with each other but are at a substantial distance apart. Despite this substantial distance, the cubic TUIs are still able to detect each other, provided the distance between each optical-based sensor pair is not too great. This increases the possibility of detecting unintended spatial relationships between the cubic TUIs. It is possible to reduce the maximum distance between the cubic TUIs such that they can detect each other's presence, but it is difficult to do so without the receiver of the sensor pair becoming susceptible to light fluctuations in the ambient environment (due to for example, sunlight through windows).

FIG. 7(*b*) shows system 700 comprising cubic TUIs whose proximity sensing systems work by detecting actual physical contact between the cubic TUIs. Using such proximity sensing systems can overcome the above-mentioned problem of detecting unintended spatial relationships between cubic TUIs at a substantial distance apart. However, in such proximity sensing systems, while it may not be difficult to achieve and maintain a certain degree of physical contact between cubic TUIs on top of one another with the help of gravitational force, it is often hard to achieve or maintain the same degree of physical contact between cubic TUIs placed alongside each other.

Electrodes may be used in the proximity sensing systems to detect actual physical contact between adjacent cubic TUIs since a direct electrical connection may be established between a pair of electrodes when the electrodes are brought into physical contact with each other. However, the manufacture of physical mechanisms to ensure that multiple electrodes on one cubic TUI simultaneously contact corresponding electrodes on another cubic TUI and to establish robust electrical connections between the contacting electrode pairs often requires costly precision assembly and parts. For example, very flat cubic TUI faces with precisely flushed electrode contacts at multiple positions are often necessary. In addition, just a slight tilt misalignment between the cubic TUIs caused by, for example, placing the cubic TUIs on mildly uneven surfaces, may be sufficient to result in electrical contact failure between the electrode pairs. Moreover, proximity sensing systems using electrodes require precise physical connectivity. Thus, they are not resilient to slight 3D misalignments between the TUIs. Therefore, such proximity sensing systems are unlikely to work well for play-based interactive applications for young children as these applications often require some degree of tolerance to slight misalignments since there is a tendency for young children to arrange the TUIs quickly and casually. Preferably, the i-Cubes in system 300 by contrast are more resilient to a small translational misalignment or a small rotational misalignment, as shown in FIG. 7(*c*).

Short Range Inductive-Based Sensors

The proximity sensing system of the i-Cube may comprise at least one inductive-based sensor. This is preferable over the use of optical-based sensors and electrodes.

Short-Range, Low Bandwidth Wireless Communication

Each inductive-based sensor of the i-Cube is configured to interact with at least one other inductive-based sensor within a predetermined sensing distance. This allows one or more adjacent i-Cubes comprising the at least one other inductive-based sensor to be detected. The interaction between each inductive-based sensor pair is done via wireless short range signals.

Figure 8:
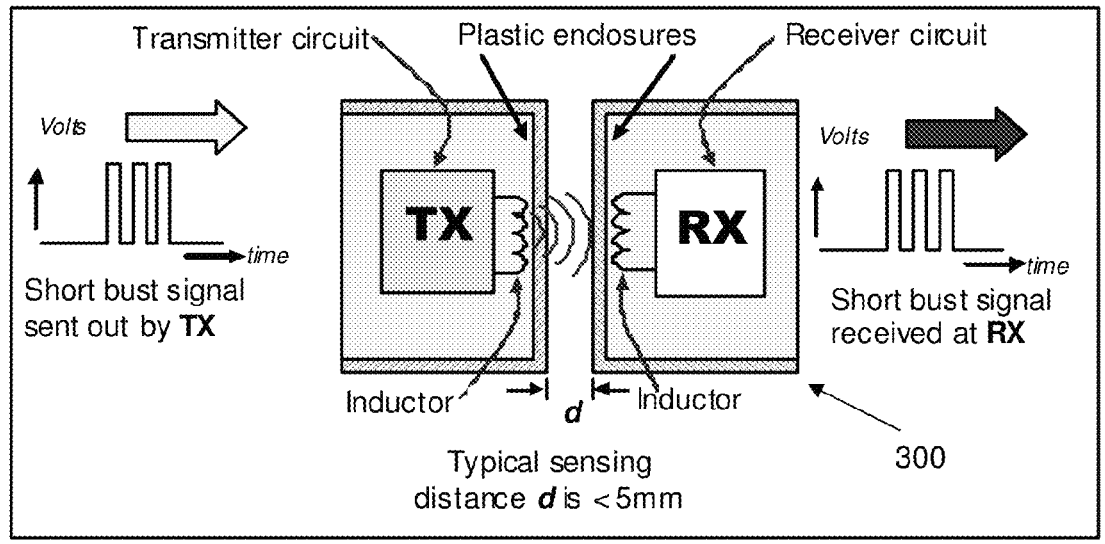
FIG. 8 shows the system of FIG. 3 comprising i-Cubes using inductive-based sensors as proximity sensors.

FIG. 8 shows system 300 comprising i-Cubes whose proximity sensing systems utilize inductive-based sensors. As shown in FIG. 8, the proximity sensing system of each i-Cube may comprise a transmitter circuit with at least one inductive-based sensor functioning as an emitter and a receiver circuit with at least one inductive-based sensor functioning as a receiver. In FIG. 8, the inductive-based sensors are in the form of inductors. Note that although in FIG. 8, each i-Cube is shown to have either a transmitter circuit or a receiver circuit, each i-Cube in fact comprises both types of circuits.

An inductive-based sensor pair (i.e. an emitter and a receiver) works in the following manner: the emitter is configured to transmit short range bust signals wirelessly. The range of these bust signals is such that the receiver can only receive these signals when it is within the predetermined sensing distance of the emitter (in one example, this sensing distance is less than 5 mm). Upon receipt of the short range bust signals, the receiver is activated. This establishes a short-range wireless communication channel between the inductive-based sensor pair, and hence, between the i-Cubes comprising this inductive-based sensor pair.

Due to the relatively shorter sensing distances of typical inductive-based sensor pairs, the receiver of an inductive-based sensor pair is activated only when i-Cubes comprising the sensor pair are in physical contact or when they are in very close proximity. Therefore, detection of unintended spatial relationships resulting in false triggers when a pair of i-Cubes is at a substantial distance apart may be avoided. As mentioned above, such false triggers are likely to be present if optical-based sensors are used. Furthermore, unlike the proximity sensing systems using electrodes, the proximity sensing systems using inductive-based sensors do not require a rigid alignment of the i-Cubes for the sensor pairs to interact. Moreover, no line-of-sight alignment between the emitter and receiver of an inductive-based sensor pair is required, making such sensing technology more resilient to slight 3D misalignments such as those shown in FIG. 7(*c*). In addition, as the inductive-based sensors operate using wireless short range signals, they can interact through the physical enclosures of the i-Cubes. As such, the inductive-based sensors may be housed within the enclosures of the i-Cubes. Thus, there is no need for a costly assembly of precisely flushed sensors on the i-Cube faces. Degradation of the sensors due to abrasive wear and exposure to corrosive human sweat can also be avoided.

Power-Consumption Friendly Design

Figure 9:
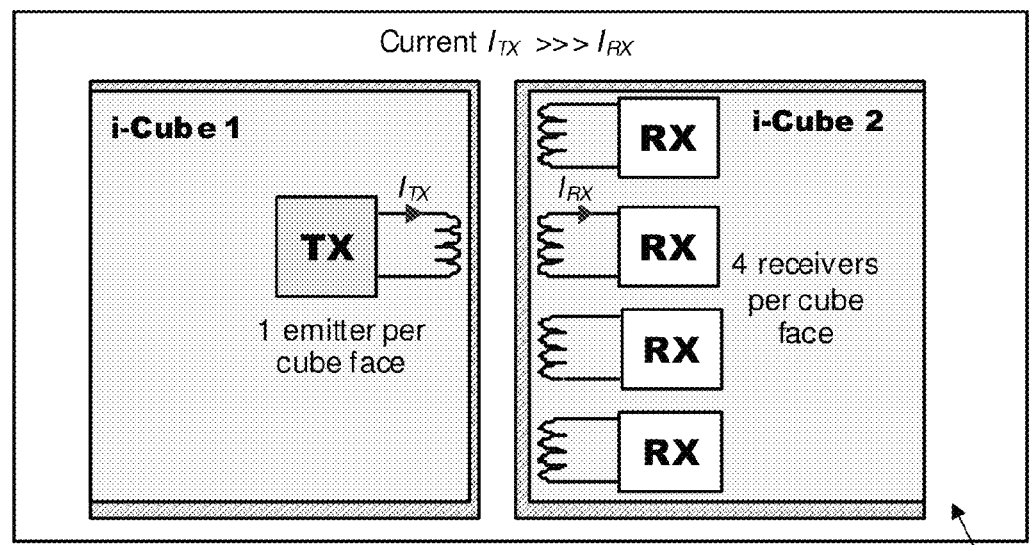
FIG. 9 shows the system of FIG. 8 with each i-Cube comprising more inductive-based sensors functioning as receivers than inductive-based sensors functioning as emitters.

As mentioned above, the proximity sensing system of each i-Cube comprises a transmitter circuit with at least one emitter and a receiver circuit with at least one receiver. When active, the current consumption of a typical emitter is usually hundreds of times more than that of a passive receiver. In order to prolong the per-charge usable life of an i-Cube, it is preferable if the number of emitters is less than the number of receivers in the i-Cube. FIG. 9 shows system 300 comprising i-Cubes with such proximity sensing systems. In particular, in FIG. 9, the i-Cube comprises, at each of its faces, one emitter and four receivers.

Sensor Placement Strategy

The inductive-based sensors of an i-Cube may be arranged so that in the presence of one or more adjacent i-Cubes, it can be determined which face(s) of the i-Cube oppose adjacent i-Cube(s).

To achieve the above, each face of the i-Cube is associated with one or more receivers. When any of the receivers associated with the face(s) are activated by receiving short range signals from emitter(s) of the adjacent i-Cube(s), those face(s) of the i-Cube can be identified. For example, the i-Cube may comprise at least one receiver on each of two or more of its faces, and preferably at least one receiver on each of its faces.

The inductive-based sensors of the i-Cube may also be arranged so that the relative orientation of opposing faces of the i-Cube and its adjacent i-Cube(s) can be determined.

For instance, the emitter(s) and receiver(s) of the i-Cube may be arranged such that when the receiver(s) are activated upon receiving short range signals from emitter(s) of the adjacent i-Cube(s), the relative orientation of the opposing faces can be determined based on the positions of the activated receiver(s). For example, the i-Cube may comprise at least four receivers on at least one of its faces (and preferably at least four receivers on each of its six faces) and the receivers may be arranged proximate edges of the corresponding i-Cube faces. In particular, one or more of these receivers may be arranged along each edge of at least one of its faces (for example, at a midpoint of each edge or at each corner). Emitters of the i-Cube may be arranged nearer to some of the receivers.

Figure 10:
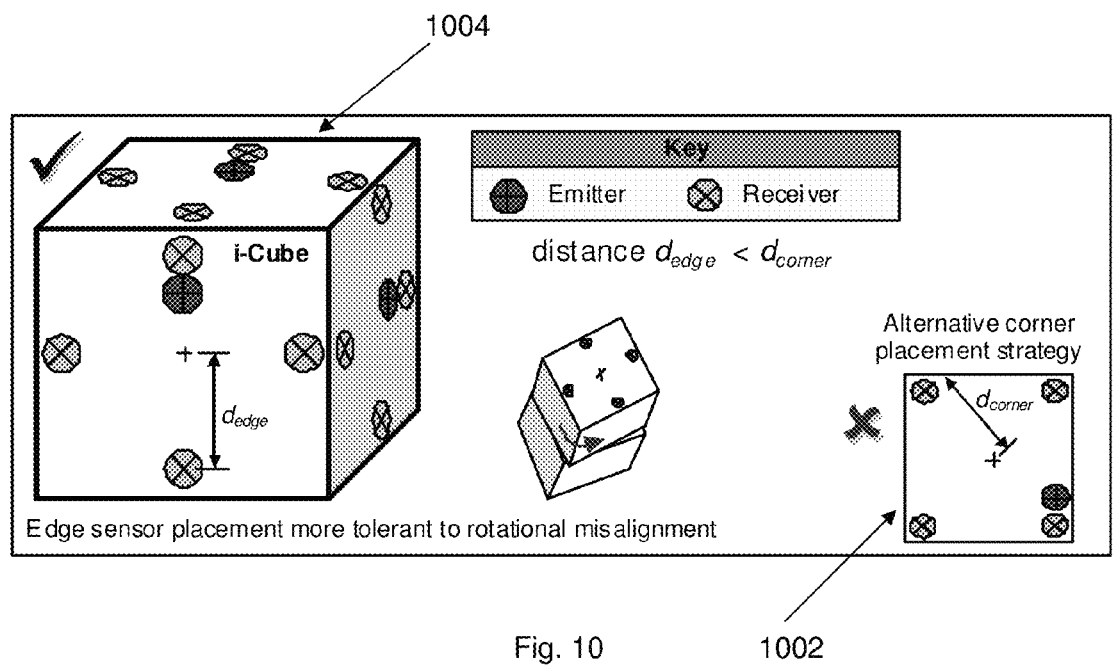
FIG. 10 shows two example placements of the inductive-based sensors in the system of FIG. 8.

FIG. 10 illustrates two example placements 1002, 1004 of the inductive-based sensors of the i-Cube.

Specifically, in both example placements 1002 and 1004, the i-Cube comprises one emitter and four receivers on each of its faces, with the receivers arranged in a symmetrical manner for each face and the single emitter placed nearer one of the receivers than the other receivers.

The placement of receivers on all six faces of the i-Cube in both example placements 1002, 1004 allows the i-Cube to determine, in the presence of adjacent i-Cubes, which of its faces oppose the adjacent i-Cubes. Furthermore, the use of only one emitter and four receivers, together with the example placements 1002, 1004, allow the relative orientation of opposing i-Cube faces to be computed. This may be done by determining which of the four receivers of an i-Cube is activated by the single emitter of an adjacent i-Cube.

In placement 1002, a receiver is placed at each corner of each i-Cube face whereas in placement 1004, a receiver is placed at the mid-point of each edge of each i-Cube face. Placement 1004 is more advantageous as compared to placement 1002 because the distance of each receiver from the centre of the cube face, $d_{edge}$, in placement 1004 is less than the distance of each receiver from the centre of the cube face, $d_{corner}$, in placement 1002. Thus, placement 1004 provides additional robustness against slight rotational misalignment of the cube faces since in placement 1004, the separation between an emitter-receiver pair is much smaller per degree of rotational offset as compared to placement 1002.

Primary Communication System

As mentioned above, between two i-Cubes with proximity sensing systems utilizing inductive-based sensors, a short-range wireless communication channel may be established when they are within the sensing distance of each other. This short-range wireless communication channel has a low communication bandwidth and thus, the information communicated via this channel mainly relates to the question "Is there an emitter present?". Preferably, due to the limited bandwidth of the short-range wireless communication channel no other information such as the identification numbers of the i-Cubes or the identities of the opposing i-Cube faces is communicated via this channel. This permits the reliable use of the inductive-based sensors to achieve the basic functional requirements of detecting the presence of adjacent i-Cubes.

Long-Range High Bandwidth Wireless Communication

However, to determine the 3D spatial configuration of a plurality of i-Cubes, information regarding the unique identities of the i-Cubes and their faces may be required as well.

Therefore, each i-Cube in system 300 may further comprise a primary communication system configured to communicate long-range high bandwidth signals wirelessly whereby the range of these signals is greater than the predetermined sensing distance, and the bandwidth of these signals is greater than that of the short range signals communicated via the inductive-based sensors. This thus enables the establishment of two-way long-range high bandwidth wireless communication channels between the i-Cube and other parts of system 300.

The primary communication system of the i-Cube allows it to communicate with other i-Cubes at a distance away. Mobile untethered interactivity between the i-Cubes is therefore enabled. The primary communication system of the i-Cube also allows it to communicate with a host device which may be placed at a distance away. The host device serves as a master wireless controller and may be a computer system (PC) or another i-Cube specially configured to be the master i-Cube. Via the two-way long-range high bandwidth wireless communication channels, the host device may be configured to receive input from and provide output to one or more i-Cubes. For instance, commands from the host device may be broadcast to the i-Cubes and therefore, the host device can maintain a central control of the i-Cubes. The host device may also trigger appropriate output responses on selected i-Cubes. In particular, the host device may send a command to a particular i-Cube to light up one of its faces with a specific color or play a particular soundtrack in its local storage. Furthermore, depending on the needs of the interactive application the system 300 is used for, the long-range high bandwidth wireless communication channels may be used by the host device to make regular enquiries about the tilt angles or motion status of the i-Cubes as determined by for example, 3-axis accelerometers in these i-Cubes.

As mentioned above, due to the limited bandwidth of the communication channels established by the inductive-based sensor pairs, higher bandwidth information such as the identification number of each i-Cube or the identities of opposing i-Cube faces is preferably not communicated via the inductive-based sensors. Such higher bandwidth information required for determining the relative 3D positional relationship of the i-Cubes can instead be communicated via the two-way long-range high bandwidth wireless communication channels.

Note however that the i-Cube may employ a more sophisticated proximity sensing system and in this case, the identification numbers of the i-Cubes may instead be transmitted via the communication channels set up by the proximity sensing systems. This can speed up the process of determining the relative 3D positional relationship of the i-Cubes. Inductive-based sensors may still be employed in the more sophisticated proximity sensing system but more complex inductive receiver circuits and interfacing are required.

The wireless communication method adopted for the primary communication system can be one of several standard industrial options such as Bluetooth, ZigBee or a proprietary wireless communication protocol. However, it is preferable if the primary communication system is low-powered, especially if the i-Cubes are battery-operated.

In one example, the processor of the i-Cube has built-in wireless communication capability. In other words, the primary communication system is integrated with the processor of the i-Cube. For example, the processor may be in the form of a micro-controller unit (MCU) such as the Texas Instruments CC2510 with its SimpliciTI wireless communication protocol similar to that of the ZigBee wireless communication protocol.

Using Both Types of Wireless Communication to Determine the 3D Spatial Configuration of the i-Cubes The system 300 may be configured to use both the short-range low bandwidth wireless communication channels established by inductive-based sensor pairs and the long-range high bandwidth wireless communication channels provided by the primary communication systems to determine the 3D spatial configuration of a set of i-Cubes.

Figure 11:
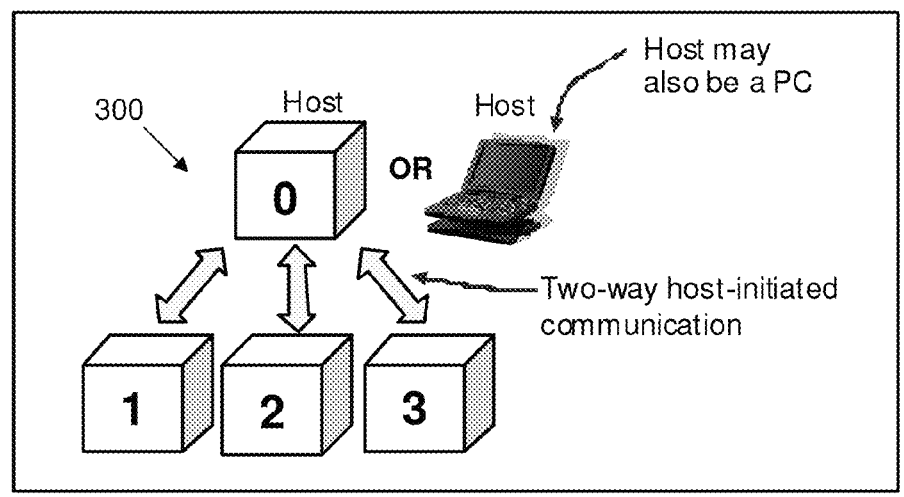
FIG. 11 shows the system of FIG. 3 with the i-Cubes configured to communicate wirelessly with a host device in a star-shaped topology.

FIG. 11 shows system 300 with the i-Cubes (with identity numbers "1"-"3") configured to communicate wirelessly with a host device (with identity number "0") in a star-shaped topology. This uses the long-range high bandwidth wireless communication channels provided by the primary communication systems of the i-Cubes. Note that to enable broadcasting of commands to (and thus, control of) multiple i-Cubes using a single master e.g. a host device, the wireless network established by the primary communication systems of the i-Cubes must at least support such a star-shaped topology.

Figure 12:
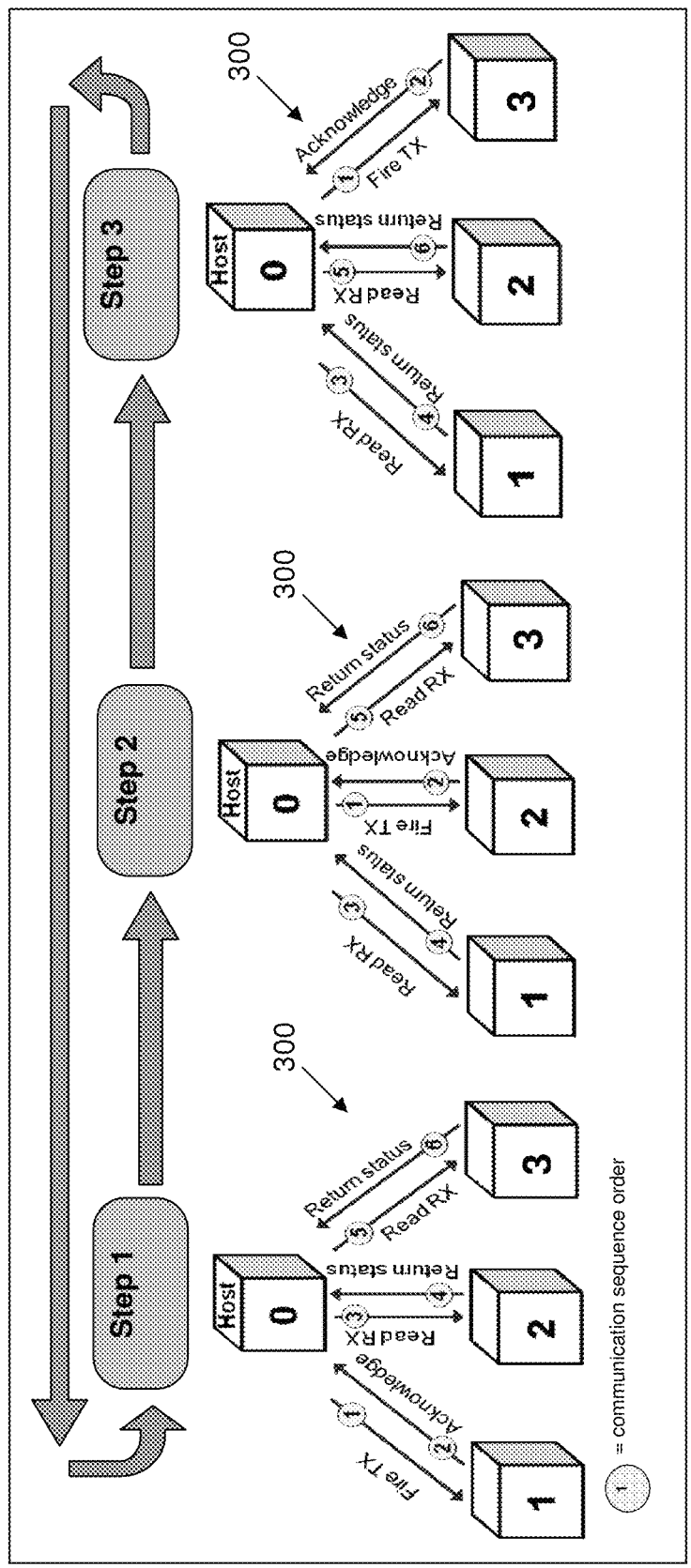
FIG. 12 shows steps illustrating how the host device communicates with the i-Cubes in FIG. 11.

FIG. 12 shows how the host device in FIG. 11 may be configured to communicate with the i-Cubes "1"-"3" so as to determine a relative arrangement of the i-Cubes "1"-"3".

In FIG. 12, the identity number ("1"-"3") of each i-Cube is known to the host device. The host device is configured to initiate communication with the i-Cubes "1"-"3" and is further configured to activate each i-Cube "1"-"3" in turn. In each turn (i.e. polling cycle), the host device activates the i-Cube by triggering its emitters to send wireless short range bust signals. Then, the host device determines the activation status of each receiver (i.e. whether the receiver is activated) of each remaining i-Cube. Based on the activation status of these receivers, the host device is able to determine the relative arrangement between the activated i-Cube and the remaining i-Cubes. In particular, the host device can determine the i-Cubes adjacent to the activated i-Cube, and the relative arrangement between these adjacent i-Cubes and the activated i-Cube (specifically, the faces of the adjacent i-Cubes opposing the activated i-Cube and the relative orientation of the opposing i-Cube faces).

Specifically, as shown in step 1 of FIG. 12, the host device first activates i-Cube "1" by sending it a "Fire TX" command. Upon receiving the "Fire TX command", i-Cube "1" returns an "Acknowledge" signal to the host device via its primary communication system. At the same time, i-Cube "1" fires all its six inductive-based emitters simultaneously (or one after another in very quick succession, such as during at most 20 milliseconds, and preferably during at most 10 milliseconds. This reduces the maximum peak current drain and electrical noise in the power supply. Generally no enquire step is performed during this period. The successive firing of the emitters should preferably be done in the in the fastest possible manner permitted by the processing capabilities of the embedded processor in order to reduce the overall time taken to complete one polling cycle.) to activate nearby inductive-based receivers within the sensing distance, thus establishing short-range wireless communication channels with these nearby receivers. The host device, upon receiving the "Acknowledge signal", then sends i-Cube "2" a "Read RX" command. In response, the i-Cube "2" sends the host device information regarding the activation status of each of its receivers via its primary communication system. This information is sent together with a "Return status" signal. The same is repeated for i-Cube "3" to determine the activation status of its receivers. In steps 2 and 3, i-Cubes "2" and "3" are activated in turn and a process similar to that as described for step 1 is performed.

By repeatedly cycling through the i-Cubes "1"-"3" using the "fire-and-enquire" strategy described above, the relative arrangement of the i-Cubes "1"-"3" may be constantly updated. In other words, steps 1-3 in FIG. 12 may be repeatedly performed so as to obtain updated relative arrangements of the i-Cubes "1"-"3".

Note that to determine the relative arrangement of the i-Cubes, the host device may be configured to communicate with the i-Cubes using a "fire-and-enquire" strategy different from that described above. For example, in each turn, the i-Cube to be activated may be instructed by the host device to fire its emitters sequentially instead of simultaneously. In this case, based on the activation status of the nearby receivers, the host device can not only determine which of the other i-Cubes are adjacent to the activated i-Cube, but can also determine which of the other i-Cubes is adjacent to each face of the activated i-Cube. However, such an alternative "fire-and-enquire" strategy requires a larger amount of communication between the host device and the i-Cubes. On the other hand, the "fire-and-enquire" strategy as described above with reference to FIG. 12 allows the host device to obtain all the necessary information to determine the relative arrangement between the i-Cubes using a minimal amount of communication between the host device and the i-Cubes. This helps to reduce the amount of time required for each polling cycle.

The host device may be further configured to determine the 3D spatial configuration (with respect to the direction of Earth's gravity) of the i-Cubes "1"-"3" using the relative arrangement of the i-Cubes "1"-"3" (as determined above) and the vertical orientation of at least one of the i-Cubes "1"-"3". The vertical orientation may be determined using the physical sensing system as described above. The 3D spatial configuration of the i-Cubes "1"-"3" may also be repeatedly determined and constantly updated.

Output System

Each i-Cube may further comprise an output system configured to provide one or more types of output.

Visual Output

In one example, the output system is configured to provide visual output, for example, light to the i-Cube. The light may be for distinguishing the i-Cube from other i-Cubes and/or for distinguishing each face of the i-Cube from its other faces.

To provide the visual output, the output system may comprise at least one light emitting diode (LED). For example, the output system may comprise six RGB LEDs of different colors and/or intensity, one for each i-Cube face, such that each i-Cube face may be lit with a different color and/or intensity. Similarly, the output systems of different i-Cubes may comprise LEDs of different colors and/or intensities such that each i-Cube, when lit, is distinguishable from the other i-Cubes.

The output systems of the i-Cubes may also be configured to provide the system 300 the ability to selectively light up a particular i-Cube or a particular i-Cube face. Therefore, in an interactive application, the contextual relevance of one or more i-Cubes and/or i-Cube faces (which could be, for example, marked with specific text and/or pictures) may be highlighted. For example, the system 300 may simply light up a particular i-Cube (or all the faces of this i-Cube) to indicate that this i-Cube is relevant.

To provide a richer programmable visual output, the output system may comprise at least one color or black and white liquid crystal display (LCD) on at least one of the i-Cube faces. For example, the output system may comprise six color LCDs, one on each i-Cube face. Each LCD may be programmed to display a different visual pattern which may be one of six possible visual motifs chosen by for example, the user or the designer of the application.

Audio Output

In one example, the output system of the i-Cube is configured to provide audio output (e.g. speech or music).

The output system may comprise a speaker (for example, a tiny vibration speaker) to locally render sound so as to provide the audio output.

Local playback or modification of the sound may be accomplished by the processor of the i-Cube. The audio data input for the sound may either be obtained from a local storage in the i-Cube (e.g. from a removable micro-SD card for language reconfiguration) or from a host device via wireless communication.

Tactile Output

The output system may be configured to provide tactile output. For example, the output system may comprise a speaker whose vibration mode can be used to provide tactile feedback to the user when required.

Power Source

Each i-Cube further comprises a power source for powering its other components. In one example, the power source comprises a re-chargeable battery which may be a re-chargeable Lithium-ion (or equivalent) battery.

Enclosure

Each i-Cube further comprises an enclosure for housing its other components, for example, the components (processor, sensing system, power source etc.) listed above and the electronic circuit assembly interconnecting these components.

The enclosure of the i-Cube is cube-shaped. Furthermore, the enclosure may be non-metallic and may be made of a non-conductive material such as rubber or acrylic. Preferably, the enclosure is made of a transparent or translucent material such that light emitted within the i-Cube is visible from outside the enclosure. Furthermore, the enclosure may have strategically placed holes or connectors to allow electrical access to the power source (e.g. a re-chargeable battery) or to house a switch for turning the i-Cube on and off.

Modes of Operation of the i-Cube

Figure 13:
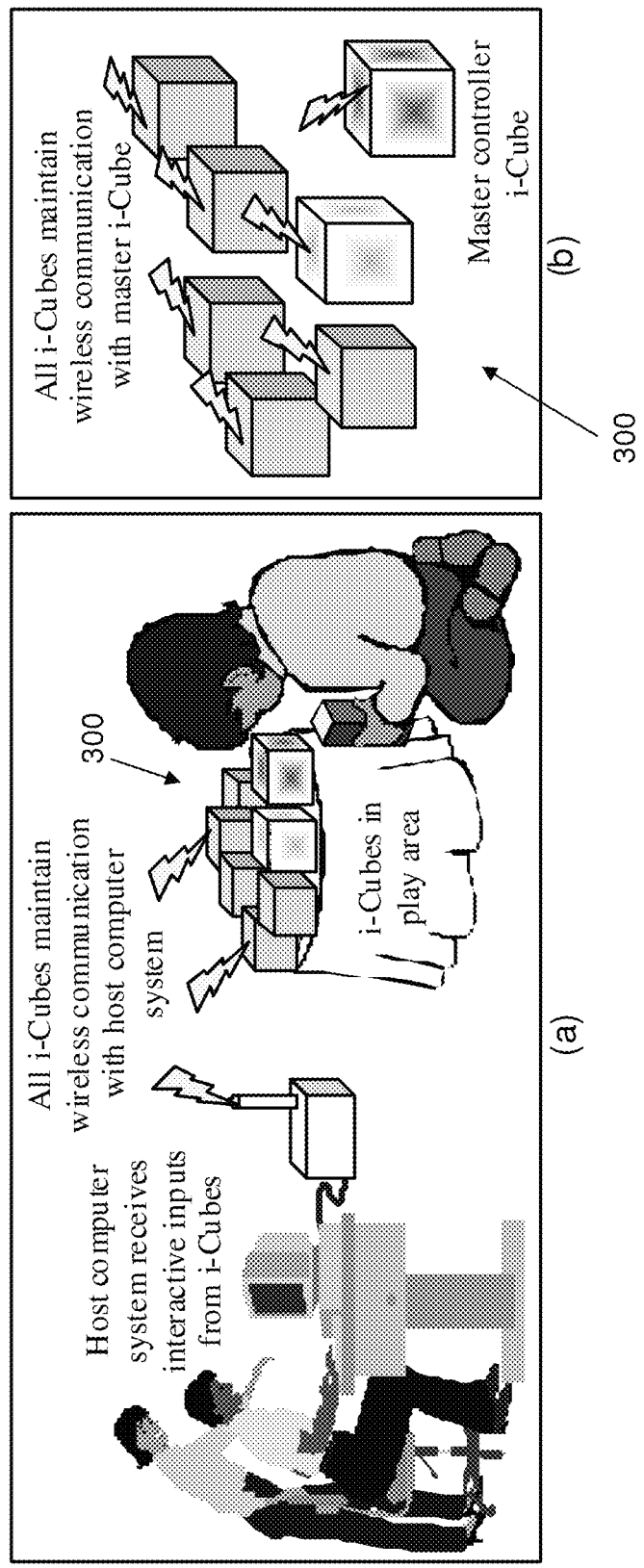
FIGS. 13(a)-(b) show two modes of operation of the system of FIG. 3.

FIGS. 13(a) and (b) show two modes of operating system 300, namely the host computer mode and the standalone mode.

The host computer mode is shown in FIG. 13(a). This mode may be used with a host device in the form of a computer system. The interactive application to be run may be resident on the computer system. In addition, the computer system may be configured to receive interactive inputs from the i-Cubes in system 300 and further configured to run the interactive application based on these inputs.

In this mode, all the i-Cubes in system 300 maintain wireless communication with the computer system via their primary wireless systems. As shown in FIG. 13(a), the i-Cubes in system 300 may be in a play area away from the computer system.

The standalone mode is shown in FIG. 13(b). To use this mode, one of the i-Cubes in system 300 is specially configured to be the master controller i-Cube which serves as the host device. The remaining i-Cubes maintain wireless communication with this master controller i-Cube via their primary wireless systems. The interactive application to be run may be distributed among the embedded computing systems of the i-Cubes.

The host device (computer system) in the host computer mode comprises a more powerful processor than the host device (master controller i-Cube) in the standalone mode. Therefore, the host computer mode in FIG. 13(a) is more reconfigurable and thus, although it is more costly, it is more suitable for implementing systems such as a flexible educational system based on the interactive block play paradigm. On the other hand, the dedicated standalone mode shown in FIG. 13(b) is more suitable for implementing standalone systems such as interesting block-based puzzle games that can be sold as a dedicated set of two to six i-Cubes.

i-Cube Educational System

System 300 may be configured to be an educational tool. In one example, the system 300 is configured to be an i-Cube educational system for teaching various concepts e.g. concepts shown in FIGS. 14(a)-(c), 15(a)-*(b) and 16(a)-(b). The i-Cube educational system aims to emphasize learning through play.

The i-Cube educational system is derived from observations of children playing blocks. Since the i-Cube educational system is able to determine 3D spatial relationships between the i-Cubes, it may be used to implement intriguing interactive tangible block-based educational play activities that are based on self-discovery pedagogies. The strength of the i-Cube educational system is that it allows educators to design and customize the objectives and focus of the user's learning (e.g. addition, basic number counting, color blending etc.). This may be achieved through the use of different visual icons on the i-Cube faces and/or programmed event-response scenarios authored during curriculum design. The i-Cube educational system is also able to incorporate software-based intelligent detection of contextual errors made by the user in his/her arrangement of the i-Cubes, and provide appropriate and timely audio-visual feedback to scaffold the user's learning experience.

The i-Cube educational system may be used for different learning sessions, each with different learning objectives. The i-Cube educational system may employ the host computer mode shown in FIG. 13(a) and in this case, the curriculum for each learning session may reside on the host device (i.e. computer system) and may be selectively changed based on the desired learning objectives for the session. The curriculum may comprise information such as event-response scenarios and data set pre-authored by the curriculum designer.

In the host computer mode, the host device of the i-Cube educational system maintains wireless communication with each i-Cube (which can be seen as a node in the wireless network). In one example, at the start of every learning session, some reconfiguration information (e.g. audio data) specific to the curriculum is downloaded from the host device into each i-Cube via the wireless communication. This prompts the user of the i-Cube educational system to either rearrange the i-Cubes or leave them in their current 3D spatial configuration. The spatial relational information of the i-Cubes is then determined by the host device using for example, the method described above with respect to FIG. 12. The curriculum residing in the host device is then consulted to determine the appropriate response in view of the spatial relational information of the i-Cubes. This response is then transmitted by the host device to one or more "relevant" i-Cubes. Each "relevant" i-Cube is identified using its unique address identifier. This ensures that the remaining "non-relevant" or "listening" i-Cubes remain unresponsive.

The following describes some examples of how the i-Cube educational system can be used to achieve certain educational objectives.

Mathematics

The i-Cube educational system not only has all the intrinsic pedagogical elements of traditional educational blocks (whose ability to convey mathematical concepts such as sameness, difference, patterns, etc (Gura, 1992) is well known), it is also able to facilitate the design of more sophisticated and purposeful learning scenarios due to its ability to sense relational information between the various i-Cubes and to provide audio-visual responses.

In structured learning scenarios, the host device in an i-Cube educational system may command one or more i-Cubes to verbalize instructions to a user to perform a task. The host device may further command the i-Cubes to give performance feedback to the user after the task is completed. If the task is not performed correctly within a pre-determined duration, the host device may command one or more i-Cubes to verbalize prompts to the user.

Figure 14:
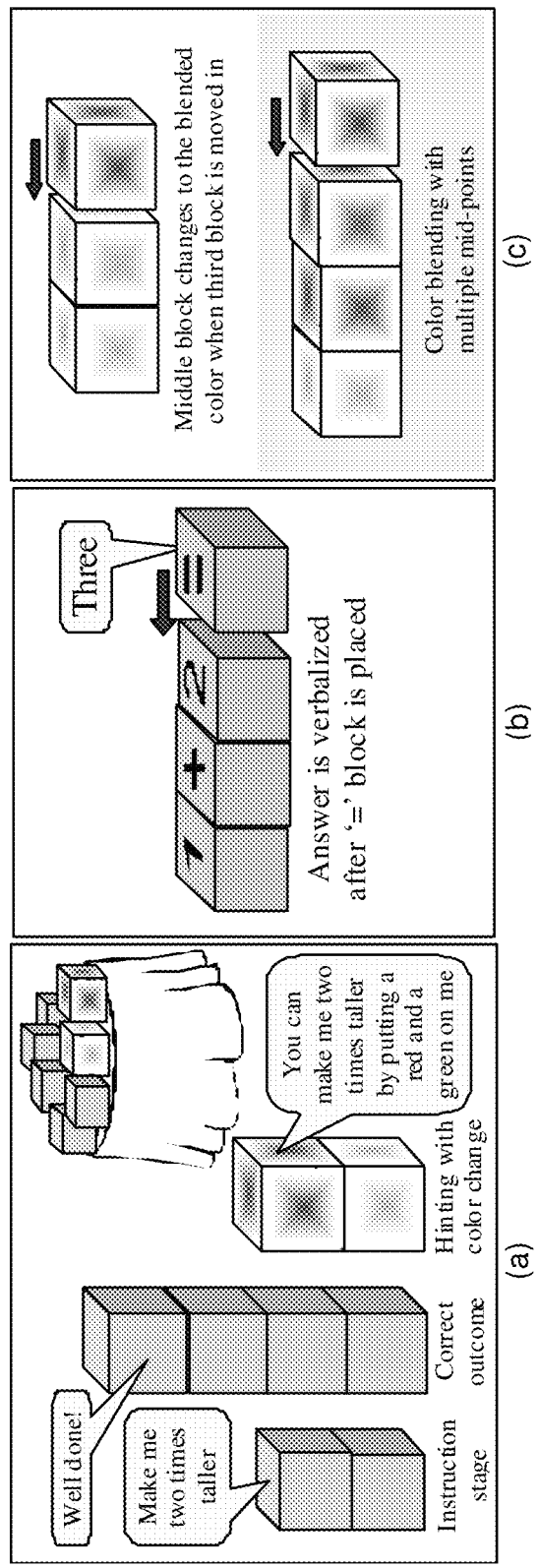
FIGS. 14(a)-(c) shows how the system of FIG. 3 may be configured for teaching mathematics and art.

FIG. 14(a) shows an example of how the i-Cube educational system may be used for a structured learning scenario in which numeric proportion is taught. In particular, in FIG. 14(a), at an instruction stage, one of the i-Cubes in a stack is commanded to verbalize an instruction to make the stack two times taller. If the user correctly performs this task, a performance feedback for example, the words "Well done!", may be verbalized by one of the i-Cubes in the new stack. If not, prompts using for example, visual output in the form of different colored lights, may be given to the user. Verbal prompts may be given to the user at the same time via one of the i-Cubes as shown in FIG. 14(a).

The i-Cube educational system also allows exploratory self-learning where a user freely permutes different labeled i-Cubes and solicits corresponding verbal feedback.

FIG. 14(b) shows an example of how the i-Cube educational system may be used for exploratory self-learning of simple addition. In particular, three i-Cubes labeled "1", "+" and "2" may be arranged side-by-side to express the addition "1+2". As shown in FIG. 14(b), the answer to this addition may be verbalized by an i-Cube labeled "=" when this i-Cube is brought within the sensing distance of the i-Cube labeled "2".

Art

The i-Cube educational system may also be used for teaching art concepts.

FIG. 14(c) shows an example of how the i-Cube educational system may be used for exploratory self-learning of the concept of color blending. In the i-Cube educational system in FIG. 14(c), different primary or secondary hue can be "mixed" together to explore the resulting color blend. For instance, in the top set of i-Cubes in FIG. 14(c), as the i-Cube on the right (i.e. third block) is aligned with the middle i-Cube (i.e. middle block), the color of the middle i-Cube changes to one that is a blend between the color of the third block and the color of the i-Cube on its left. Further i-Cubes may be aligned with this set of i-Cubes and as each further i-Cube is aligned, colors of the middle i-Cubes change based on the concept of color blending, hence creating multiple mid-points (see bottom set of i-Cubes in FIG. 14(c)).

Music

Using the i-Cube educational system, musical concepts such as harmony, melody, rhythm and tempo can also be taught through physical play and exploration. For example, i-Cubes labeled with various musical notes and instruments can be physically arranged to explore the creation of different musical outcomes.

Figure 15:
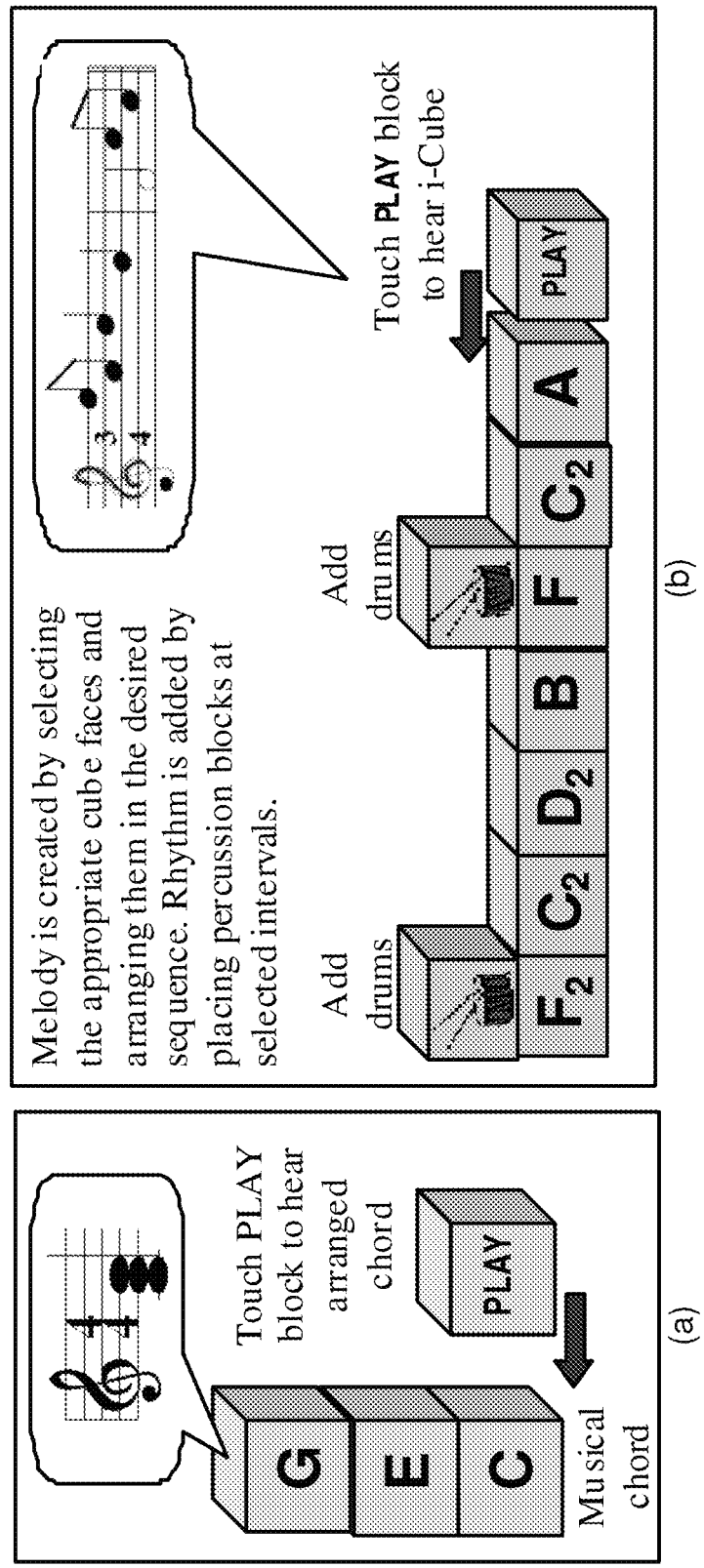
FIGS. 15(a)-(b) shows how the system of FIG. 3 may be configured for teaching music.

FIGS. 15(a) and (b) show examples of how the i-Cube educational system may be used for learning musical concepts.

In particular, FIG. 15(a) shows how the concept of harmony; the 'vertical' relationships between tones in chords (two or more tones sounded simultaneously) and chord sequences (e.g. I-V-I) can be explored by stacking i-Cubes representing different notes together. Specifically, in FIG. 15(a), a musical chord comprising the notes "G", "E" and "C" may be "formed" by arranging i-Cubes representing these notes in a vertical stack. In this case, as an i-Cube with the label "PLAY" is moved within the sensing distance of the i-Cube representing the note "C", the musical chord is played via the output system of the i-Cube labeled "PLAY".

FIG. 15(b) shows how concepts such as melody (linear succession of tones perceived as a meaningful group) and rhythm can be explored by arranging i-Cubes representing the tones in a particular manner, and by adding i-Cubes representing percussion instruments such as drums to accentuate the beat and rhythm. Specifically in FIG. 15(b), appropriate i-Cube faces are selected and arranged in a specific manner so as to "create" a melody. Furthermore, i-Cubes representing drums (i.e. percussion blocks) are added at certain locations of the arrangement to create rhythm at selected intervals. The melody is then played by moving an i-Cube labeled "PLAY" within the sensing distance of one of the i-Cubes in the arrangement.

Spatial and Relational Concepts

Like wooden play blocks, the i-Cubes in the i-Cube educational system can be physical manipulated. For example, they can be moved around, rotated, made to stack one on top of another or made to "knock" into each other. Visual icons associated with specific objects may be printed on the i-Cube faces and physical manipulation of these specific objects may be represented by the physical manipulation of the i-Cube faces with the associated visual icons. This creates many opportunities for incorporating learning concepts relating to spatial relationships such as over-under, above-below, beside, and left-right. Casual interactions between specific objects may also be taught by using the i-Cube faces with the associated visual icons. Corresponding sound playback via the host device or one of the i-Cubes may be incorporated in the learning process. For example, the processors of the i-Cubes may be programmed to narrate concepts or interactive stories via their output systems. The content of the interactive stories may change according to the arrangements of the i-Cube faces with the different visual icons.

Figure 16:
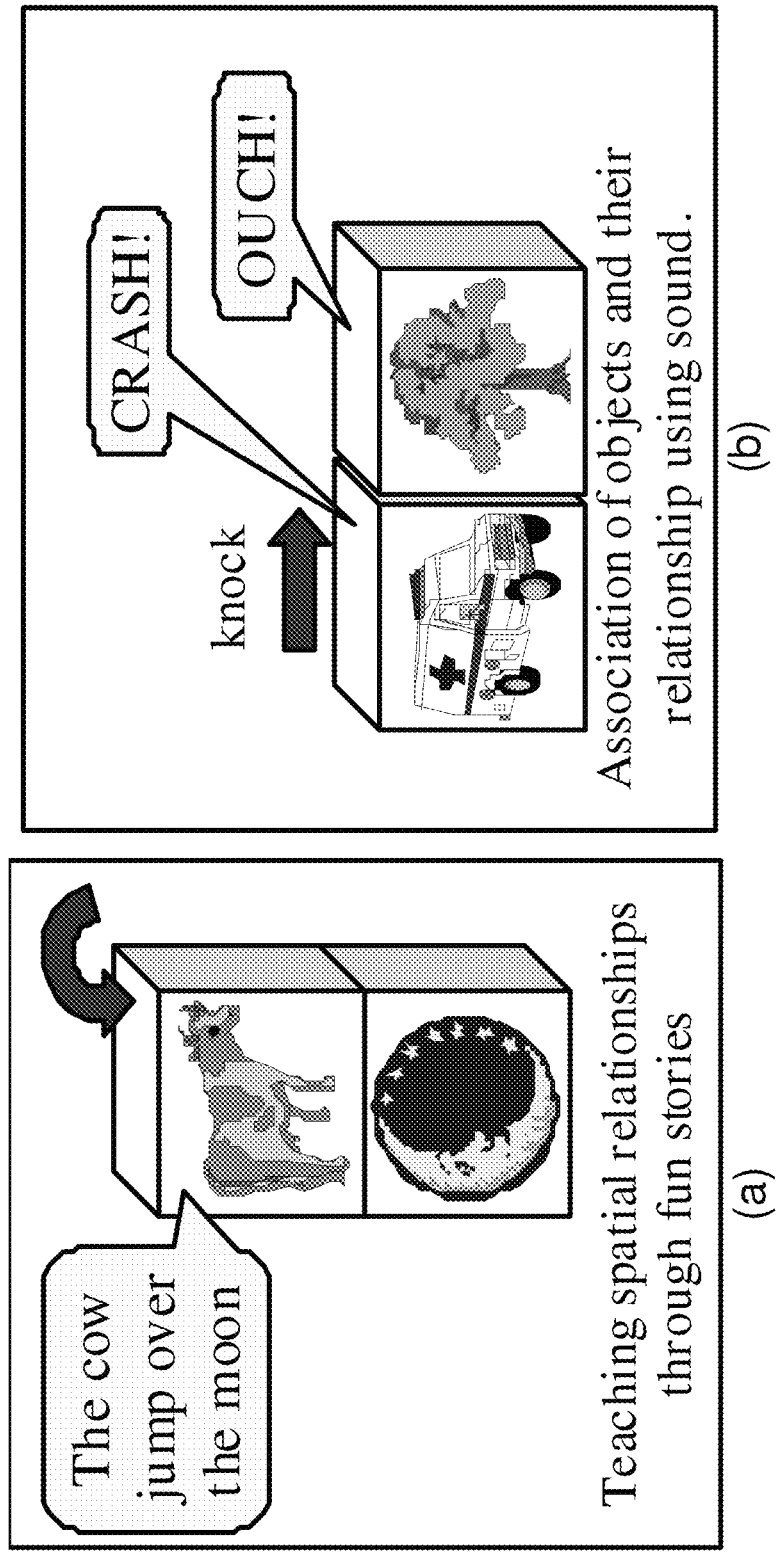
FIGS. 16(a)-(b) shows how the system of FIG. 3 may be configured for teaching spatial relationships and casual interactions between objects.

FIG. 16(a) shows an example of how the i-Cube educational system may be used for learning the concept of "over". In particular, a first i-Cube having a visual icon of a cow and a second i-Cube having a visual icon of a moon are used. By stacking the first i-Cube on top of the second i-Cube, the concept of the cow being "over" the moon may be represented. The line "The cow jump over the moon" may be narrated as the first i-Cube is stacked on top of the second i-Cube. This narration may be performed by the output system of the first i-Cube.

FIG. 16(b) shows an example of how the i-Cube educational system may be used for learning the casual interaction of "knock". In particular, a first i-Cube having a visual icon of an ambulance and a second i-Cube having a visual icon of a tree are used. The casual interaction of "knock" can be represented by the action of colliding the first i-Cube into the second i-Cube. Sounds may be used to highlight this casual interaction. For instance, as shown in FIG. 16(b), as the first i-Cube is collided into the second i-Cube, the first i-Cube is configured to verbalize the word "CRASH" whereas the second i-Cube is configured to verbalize the word "OUCH".

Advantages of System 300

The following describes some advantages of the system 300 comprising the i-Cubes.

The system 300 is able to determine the 3D spatial configuration of a plurality of i-Cubes. For example, the 3D spatial relational semantic of the i-Cubes such as "above", "under", "beside", "in-between", "to-the-left", "behind", etc can be determined. Furthermore, the relative orientations of opposing i-Cube faces and the vertical orientations of the i-Cubes can also be determined. Thus, the i-Cubes are advantageous over prior art cube-shaped TUIs as mentioned above because unlike these prior art TUIs, the spatial relational information that can be determined from the i-Cubes is not restricted to a 2D planar configuration.

FIGS. 17(a)-(d) show the advantages of system 300 over a prior art system. In FIGS. 17(a)-(d), each cube has a unique identity (numbers "1"-"6") and has 6 cube faces (labeled "A"-"F").

Figure 17:
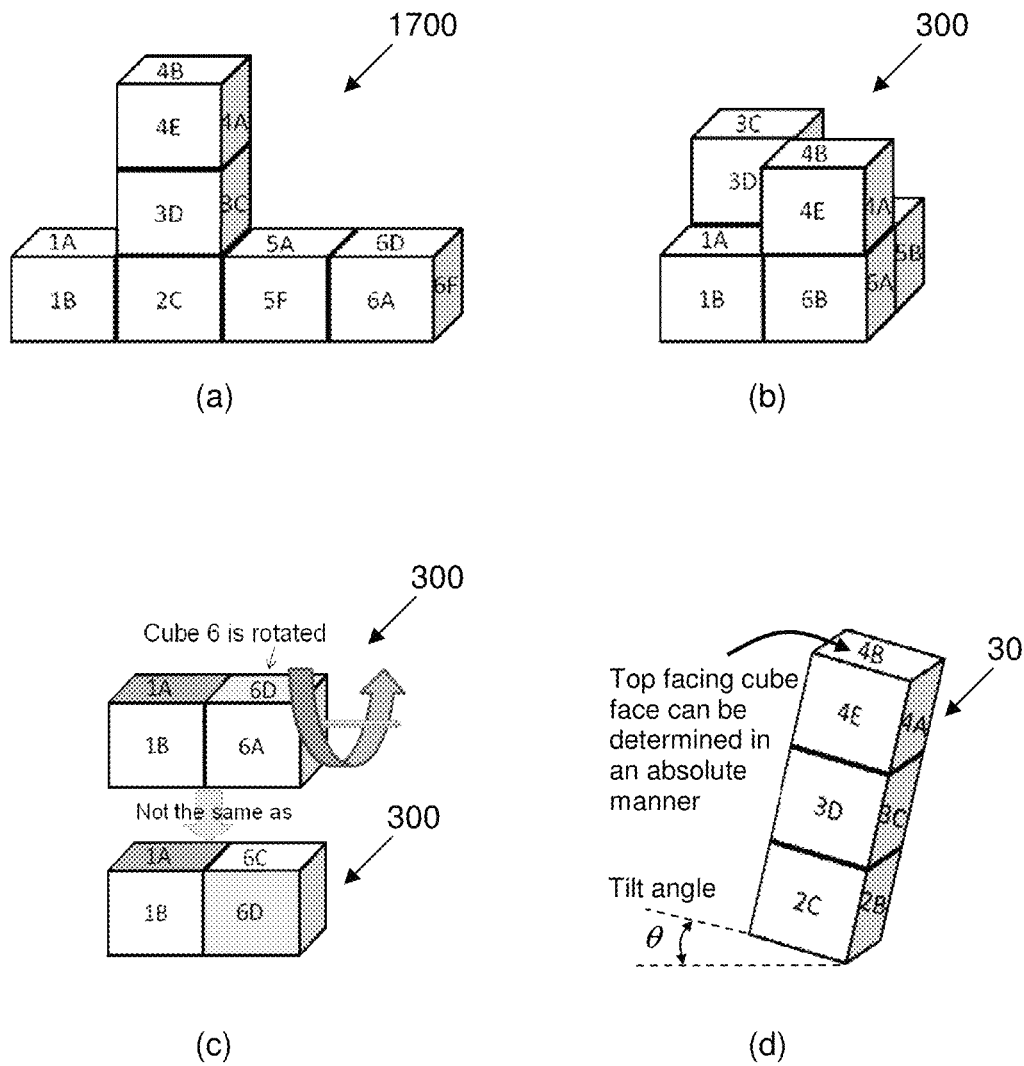
FIGS. 17(a)-(d) show the advantages of the system of FIG. 3 over a prior art system.

In particular, FIG. 17(a) shows a prior art system 1700 comprising a plurality of cube-shaped TUIs. For the system 1700 to work, the TUIs can only be arranged in a typical planar configuration as shown in FIG. 17(a).

In contrast, FIG. 17(b) shows a complex 3D configuration that the i-Cubes of system 300 can be arranged in. Such complex 3D configurations can be used in system 300 because the 3D spatial relationship between the i-Cubes can be determined.

Moreover, as shown in FIG. 17(c), system 300 is sensitive to changes in the relative orientation between adjacent i-Cubes. Thus, it is possible to determine the spatial relationship between opposing faces of the adjacent i-Cubes. This greatly increases the number of ways in which the i-Cubes can be arranged (in other words, the number of combinatorial spatial arrangements of the i-Cubes) as the constructional element in this case is not an entire i-Cube but one of its faces. The i-Cube faces may be uniquely marked with pictures or texts to allow meaningful manipulative sequencing of semantic concepts using 3D spatial arrangements of the i-Cubes.

FIG. 17(d) shows how the system 300 is also able to determine the top cube face and the tilt angle with respect to the direction of Earth's gravity of a stack of i-Cubes. This is useful when a different visual icon is attached to each i-Cube face and the visual icon at the top of a stack of i-Cubes is to be determined.

The ability of the system 300 to determine the 3D spatial configuration of the i-Cubes is partly due to the use and configuration of certain components in the i-Cube. For example, each i-Cube may comprise a physical sensing system for determining its vertical orientation and/or tilt angle. Each i-Cube may also comprise proximity sensors for detecting the presence of adjacent i-Cubes, with these proximity sensors arranged in ways to allow determination of opposing i-Cube faces and the relative orientation of these opposing i-Cube faces. The i-Cubes may also be configured to wirelessly communicate relational information to a host device so that the host device can determine the 3D spatial configuration of the i-Cubes.

The system 300 may be made more error-free by using certain components and configurations in the i-Cube. This can allow the user to manipulate the i-Cubes in system 300 in an easier and more casual manner. For example, by using inductive-based sensors as the proximity sensors in each i-Cube to detect the presence of adjacent i-Cubes, the chances of detecting an unintended 3D configuration or overlooking an intended 3D configuration of the i-Cubes (due to slight misalignments of the i-Cubes) can be reduced. The proximity sensors may also be arranged such that even with slight rotational misalignments between two adjacent i-Cubes, the intended spatial relationship between these i-Cubes may still be detected.

In addition, cube-shaped TUIs such as the i-Cubes or any other TUIs with identically shaped faces are advantageous over TUIs with differently shaped faces. This is because to activate a pair of proximity sensors on opposing TUI faces, the sensor pair has to be aligned with each other to a certain extent. It is easier to design a sensor arrangement that aligns sensor pairs on opposing identically shaped TUI faces than a sensor arrangement that aligns sensor pairs on opposing differently shaped TUI faces. Furthermore, even with a more intricately designed sensor arrangement, the user must still take extra care in arranging differently shaped TUI faces to achieve sufficient alignment of the sensor pairs on the TUI faces. On the other hand, the user can manipulate identically shaped TUI faces in a more casual manner. Note that it is even more disadvantageous to use differently shaped TUIs simultaneously in system 300.

This is because in some cases, it may not even be possible to have a sensor arrangement that enables the sensors on each TUI face to align with the sensors on any other TUI face in the system. This greatly limits the applications in which the TUIs may be used.

Each i-Cube of system 300 may also be configured such that it is power efficient. This may be achieved through the use of low-powered components such as a low-powered processor and a low-powered primary communication system, and through adjusting the ratio of emitters to receivers in the proximity sensing systems of one or more i-Cubes.

The system 300 may also be configured to use two types of wireless channels, namely, the short-range low bandwidth wireless communication channels and the long-range high bandwidth wireless communication channels. Short-range low bandwidth wireless communication channels may be established by an i-Cube to detect the presence of adjacent i-Cubes whereas long-range high bandwidth wireless communication channels may be established to wirelessly communicate higher bandwidth information such as relational information between the i-Cubes to a host device. By configuring each type of channel for a different purpose, the system 300 allows each i-Cube to detect only the adjacent i-Cubes within its sensing distance while avoiding the issue of wireless data stream communication truncation when two i-Cubes are suddenly pulled apart.

Moreover, the system 300 may be configured to provide responsive audio-visual feedback using the output systems of its i-Cubes. This may be achieved by equipping the output systems of the i-Cube with audio playback capabilities and/or configuring the output systems of the i-Cubes so that different i-Cube faces can be separately illuminated with different colors to provide multimodal sensory feedback to the user.

With the ability to determine the 3D spatial configuration of the i-Cubes and to provide responsive feedback, the system 300 can be used to implement intriguing interactive tangible block-based educational play activities that are based on self-discovery pedagogies. In particular, the i-Cubes can serve as intelligent play block-like interfaces to allow the implementation of effective and flexible play-based pedagogies for young children. The system 300 can be configured to provide context-aware feedback depending on how a set of i-Cubes are physically manipulated and arranged, via visual cues (e.g. colored lights) and/or auditory cues (e.g. musical tones, associative sound effects) that will engage the multiple sensory modalities of young children. In the hands of creative educators, the system 300 can be used to design a rich variety of play-based pedagogies that are both engaging and capable of delivering tailored learning objectives. This can contribute to new ways in which children can independently explore concepts through play in areas such as music, language and mathematics as they physically manipulate and arrange relationships of basic concepts that have been visually marked on the i-Cube faces.

Although only a single embodiment of the invention has been described in details above, it is to be understood that many variations are possible within the scope of the invention, as defined by the claims.

REFERENCES

[1] Gura P. (Ed.) (1992). *Exploring learning: Young children and block play*. New York: Paul Chapman.
[2] Wellhousen K., Kieff J., (2001). *A constructivist approach to block play in early childhood*. Canada: Delmar, Thomson Learning.
[3] Froebel F. (1887). *The education of man*. (W. N. Hailman, Trans.). New York: Appleton.
[4] Fowlkes M. A. (1984). *Gifts from childhood's godmother: Patty Smith Hill*. Children Education, vol. 6 (1), p 44-49.
[5] Montessori M., (1964). *The Montessori method*. New York: Schocken.
[6] Wolfgang C. H., Stannard L. L., Jones I. (2001). *Block play performance among preschoolers as a predictor of later school achievement in mathematics*. Journal of Research in Childhood Education, vol. 15 (2), p 173-180.
[7] Bee H. (2000). *The developing child*. ($9^{th}$ Ed.). Boston: MA, Allyn and Bacon.
[8] Meadows S. (1993). *The child as thinker: the development and acquisition of cognition in childhood*. London: UK, Routledge.
[9] Schweikardt E., Gross M. D. (2007). *A Brief Survey of Distributed Computational Toys*, The $1^{st}$ IEEE International Workshop on Digital Game and Intelligent Toy Enhanced Learning (DIGITEL '07).
[10] Cube World, from Radica Games. See http://fitness-.manualsonline.com/manuals/mfg/radica_games/cube-_world_stick_people_sticking_to-gether_instruction_manual.html
[11] CuBees, from Takara-USA. See http://www.pointless-butcool.com/gadgets/cubees
[12] Merrill, D., Kalanithi, J., Maes, P. (2007). *Siftables, Towards Sensor Network Interfaces*. In the Proceedings of the First International Conference on Tangible and Embedded Interaction (TEI'07). February 15-17 in Baton Rouge, La., USA.
[13] Blockjam, http://www.sonycsl.co.jp/IL/projects/block-jam/contents.html

[14] AudioCubes by Bert Schiettecatte, https://ccrma.stanford.edu/~bschiett/audiocubes/

The invention claimed is:

1. A tangible user interface (TUI) for use as part of a set of TUIs, the TUI comprising:
a plurality of faces wherein said plurality of faces form the outer surface of the TUI; and
a sensing system configured to detect, for each of said faces, whether another of the set of TUIs is within a predetermined sensing distance from the face, and, for each face of the TUI for which the determination is positive, determine which face of a corresponding opposing TUI is opposing that face of the TUI, and a relative orientation of that face of the TUI and the opposing face of the corresponding opposing TUI, the relative orientation being a relative angular position about a line connecting centers of the TUI and the corresponding opposing TUI;
wherein the sensing system comprises inductive-based sensors arranged to determine the relative orientation of that face of the TUI and the opposing face of the corresponding opposing TUI, wherein the TUI produces an output based on the determination of the relative orientation.

2. A TUI according to claim 1, wherein the sensing system further comprises a 3-axis accelerometer for determining the orientation of the TUI with respect to a direction of Earth's gravity.

3. A TUI according to claim 2, wherein the sensing system is further configured to determine a tilt angle of the TUI with respect to a direction of Earth's gravity.

4. A TUI according to claim 1, wherein the sensing system comprises at least one inductive-based sensor configured to interact via wireless short range signals with at least one other inductive-based sensor within the predetermined sensing distance, so as to detect the presence of one or more adjacent TUIs comprising the at least one other inductive-based sensor.

5. A TUI according to claim 4, wherein the predetermined sensing distance is less than 5 mm.

6. A TUI according to claim 4, wherein the at least one inductive-based sensor comprises:
at least one emitter for transmitting the wireless short range signals to activate the at least one other inductive-based sensor; and
at least one receiver configured to receive the wireless short range signals from the at least one other inductive-based sensor, said at least one receiver being activated upon receiving said wireless short range signals.

7. A TUI according to claim 6, wherein the number of emitters is less than the number of receivers.

8. A TUI according to claim 6, wherein the TUI comprises a plurality of receivers associated with respective ones of the faces, such that when one or more of the plurality of receivers are activated upon receiving the wireless short range signals from the at least one other inductive-based sensor of the one or more adjacent TUIs, the associated faces of the TUI can be determined.

9. A TUI according to claim 8, wherein the TUI comprises at least one receiver on each of two or more of the faces.

10. A TUI according to claim 6, wherein the at least one receiver of the TUI is arranged such that when the at least one receiver is activated upon receiving the wireless short range signals from the at least one other inductive-based sensor of the one or more adjacent TUIs, the relative orientation of opposing faces of the TUI and the one or more adjacent TUIs can be determined based on a position of the at least one activated receiver.

11. A TUI according to claim 10, wherein the TUI comprises a plurality of receivers on at least one face of the TUI, arranged proximate edges of the corresponding face of the TUI.

12. A TUI according to claim 11, wherein the plurality of receivers are arranged on the at least one face of the TUI in a symmetrical manner.

13. A TUI according to claim 12, wherein the TUI comprises a receiver at a midpoint of each edge of the at least one face of the TUI.

14. A TUI according to claim 13, wherein the at least one emitter of the TUI is arranged nearer to one of the receivers than to the other receivers.

15. A TUI according to claim 1, wherein the TUI further comprises a primary communication system configured to communicate long range signals wirelessly, the range of said long range signals being greater than the predetermined sensing distance.

16. A TUI according to claim 15, wherein:
the sensing system comprises at least one inductive-based sensor configured to interact via wireless short range signals with at least one other inductive-based sensor within the predetermined sensing distance, so as to detect the presence of one or more adjacent TUIs comprising the at least one other inductive-based sensor; and
a bandwidth of the long range signals is greater than a bandwidth of the short range signals.

17. A TUI according to claim 1, further comprising an output system configured to provide one or more of the following: audio output, light for distinguishing the TUI from other TUIs, light for distinguishing each face of the TUI from other faces, liquid crystal display for at least one face of the TUI and tactile output.

18. A TUI according to claim 1, wherein the plurality of faces are of an identical shape.

19. A TUI according to claim 1, wherein the TUI is cube-shaped.

20. A tangible user interface (TUI) for use as part of a set of TUIs, the TUI comprising:
a plurality of faces wherein said plurality of faces form the outer surface of the TUI; and
a sensing system configured to detect, for each of said faces, whether another of the set of TUIs is within a predetermined sensing distance from the face;
the sensing system comprising inductive-based sensors arranged to determine a relative orientation of a face of the TUI and an opposing face of a corresponding opposing TUI, the relative orientation being a relative angular position about a line connecting centers of the TUI and the corresponding opposing TUI;
the sensing system further comprising a 3-axis accelerometer for determining the orientation of the TUI with respect to a vertical direction, wherein the TUI produces an output based on the determination of the relative orientation.

21. A tangible user interface (TUI) system comprising a plurality of TUIs, each TUI comprising:
a plurality of faces wherein said plurality of faces form the outer surface of the TUI; and
a sensing system configured to detect, for each of said faces, whether another of the set of TUIs is within a predetermined sensing distance from the face, and, for each face of the TUI for which the determination is positive, determine which face of a corresponding opposing TUI is opposing that face of the TUI and a relative orientation of that face of the TUI and opposing face of the corresponding opposing TUI, the relative orientation being a relative angular position about a line connecting centers of the TUI and the corresponding opposing TUI;

the sensing system comprising inductive-based sensors arranged to determine the relative orientation of that face of the TUI and the opposing face of the corresponding opposing TUI;

and each TUI having a unique identity, wherein the TUI produces an output based on the determination of the relative orientation.

22. A TUI system according to claim 21, wherein in each TUI:

the sensing system comprises at least one inductive-based sensor configured to interact via wireless short range signals with at least one other inductive-based sensor within the predetermined sensing distance, so as to detect the presence of one or more adjacent TUIs comprising the at least one other inductive-based sensor; and the at least one inductive-based sensor comprises:

at least one emitter for transmitting the wireless short range signals to activate the at least one other inductive-based sensor; and at least one receiver configured to receive the wireless short range signals from the at least one other inductive-based sensor, said at least one receiver being activated upon receiving said wireless short range signals; and wherein the TUI system is configured to determine a relative arrangement of the plurality of TUIs by performing the following steps (i)-(ii) for each of the plurality of TUIs:

(i) activating the TUI by triggering the at least one emitter of the TUI to send the wireless short range signals; and (ii) determining whether each receiver of each remaining TUI is activated so as to determine the relative arrangement between the activated TUI and the remaining TUIs.

23. A TUI system according to claim 22, wherein: the sensing system of each TUI further comprises a 3-axis accelerometer for determining the orientation of the TUI with respect to a direction of Earth's gravity; and the TUI system is further configured to determine a 3D spatial configuration of the plurality of TUIs with respect to the direction of Earth's gravity from the relative arrangement of the plurality of TUIs and the orientation of at least one of the TUIs with respect to the direction of Earth's gravity.

24. A TUI system according to claim 23, wherein the TUI system is configured to repeatedly determine the 3D spatial configuration of the plurality of TUIs.

25. A TUI system according to claim 21, wherein the TUI system operates with a host device comprising either a computer system or one of the plurality of TUIs, said host device configured to communicate wirelessly with one or more of the TUIs so as to receive input from and provide output to said one or more of the TUIs.

26. A tangible user interface (TUI) system comprising a plurality of TUIs, each having a unique identity, wherein each TUI comprises:

a plurality of faces wherein said plurality of faces form the outer surface of the TUI; and a sensing system configured to detect, for each of said faces, whether another of the set of TUIs is within a predetermined sensing distance from the face;

the sensing system comprising inductive-based sensors arranged to determine a relative orientation of a face of the TUI and an opposing face of a corresponding opposing TUI, the relative orientation being a relative angular position about a line connecting centers of the TUI and the corresponding opposing TUI;

the sensing system further comprising a 3-axis accelerometer for determining the orientation of the TUI with respect to a vertical direction, wherein the TUI produces an output based on the determination of the relative orientation.

* * * * *